United States Patent
Tasaka et al.

(10) Patent No.: US 8,045,821 B2
(45) Date of Patent: Oct. 25, 2011

(54) CODING METHOD CONVERSION APPARATUS

(75) Inventors: Kei Tasaka, Nara (JP); Tatsuro Juri, Osaka (JP); Katsuo Saigo, Hyogo (JP); Hideyuki Ohgose, Osaka (JP); Koji Arimura, Osaka (JP); Hiroshi Arakawa, Nara (JP); Yuki Maruyama, Osaka (JP)

(73) Assignee: Panasonic Corporation, Osaka (JP)

( * ) Notice: Subject to any disclaimer, the term of this patent is extended or adjusted under 35 U.S.C. 154(b) by 924 days.

(21) Appl. No.: 12/031,061

(22) Filed: Feb. 14, 2008

(65) Prior Publication Data

US 2008/0199090 A1 Aug. 21, 2008

(30) Foreign Application Priority Data

Feb. 16, 2007 (JP) .................. 2007-035877

(51) Int. Cl.
*G06K 9/36* (2006.01)
*G06K 9/46* (2006.01)
*G06K 9/40* (2006.01)

(52) U.S. Cl. ......... 382/268; 382/232; 382/248; 382/250

(58) Field of Classification Search .................. None
See application file for complete search history.

(56) References Cited

U.S. PATENT DOCUMENTS

| 7,162,093 | B2 | 1/2007 | Regunathan et al. | |
|---|---|---|---|---|
| 7,492,820 | B2 * | 2/2009 | Puri | 375/240.03 |
| 7,602,851 | B2 * | 10/2009 | Lee et al. | 375/240.25 |
| 2002/0168011 | A1 | 11/2002 | Bourge | |
| 2005/0008240 | A1 * | 1/2005 | Banerji et al. | 382/238 |
| 2005/0232497 | A1 | 10/2005 | Yogeshwar et al. | |
| 2007/0074266 | A1 * | 3/2007 | Raveendran et al. | 725/135 |
| 2007/0189392 | A1 * | 8/2007 | Tourapis et al. | 375/240.21 |
| 2007/0230568 | A1 * | 10/2007 | Eleftheriadis et al. | 375/240.1 |
| 2008/0031336 | A1 * | 2/2008 | Yamaguchi | 375/240.16 |
| 2008/0240252 | A1 * | 10/2008 | He | 375/240.24 |
| 2009/0028249 | A1 * | 1/2009 | Gomila et al. | 375/240.29 |
| 2009/0161770 | A1 * | 6/2009 | Dong et al. | 375/240.29 |
| 2010/0086225 | A1 | 4/2010 | Yachida | |

FOREIGN PATENT DOCUMENTS

JP 11-112972 4/1999

(Continued)

OTHER PUBLICATIONS

Shen, Bo "Efficient deblocking and optimal quantizer selection for video transcoding", Proc. IEEE Int. Conf. Image Processing, 2003, pp. 193-196.*

(Continued)

*Primary Examiner* — Samir Ahmed
*Assistant Examiner* — Li Liu
(74) *Attorney, Agent, or Firm* — Wenderoth, Lind & Ponack, L.L.P.

(57) ABSTRACT

A coding method conversion apparatus converts the first coded data coded by the first coding method into the second coded data. The coding method conversion apparatus includes: an H.264 decoder which decodes the first coded data; a deblocking filter strength calculation unit which calculates a filter strength of deblocking filtering of a second coding method, using at least one piece of decoding information except a coding type of the first coded data, the decoding information being obtained by decoding the first coded data; and a deblocking filter which performs the deblocking filtering to reduce noise in a boundary of blocks according to the filter strength calculated by the deblocking filter strength calculation unit.

14 Claims, 7 Drawing Sheets

FOREIGN PATENT DOCUMENTS

| | | |
|---|---|---|
| JP | 2003-23640 | 1/2003 |
| JP | 2005-86830 | 3/2005 |
| JP | 2005-323353 | 11/2005 |
| JP | 2006-237759 | 9/2006 |
| JP | 2007-336468 | 12/2007 |
| WO | 2008/090793 | 7/2008 |

OTHER PUBLICATIONS

Triantafyllidis et al., "Blocking artifact reduction in frequency domain", IEEE Proc. Int. Conf. on Image Processing, 2001, 269-272 vol. 1.*

Raja et al., "In-loop deblocking filter for H.264/AVC video", ISPRA'06, Proceedings of the 5th WSEAS International Conference on Signal Processing, Robotics and Automation, 2006.*

Wiegand et al. "Overview of the H.264/AVC video coding standard", IEEE Transactions on Circuits and Systems for Video Technology, 2003, v13, 560-576.*

Zheng et al. "Deblocking filter technology for video bit-rate reduction transcoding", IEEE Int. Workshop VLSI Design & Video Tech. 2005.*

List et al. "Adaptive deblocking filter", IEEE Trans. on Circuits and Systems for Video Technology, vol. 13, 2003.*

* cited by examiner

FIG. 2

FIG. 3A block boundaries    macroblock boundary

FIG. 3B block boundaries    macroblock boundary
of second moving
picture data

| Intra MB Number | Filter Strength Evaluation Value |
|---|---|
| 0~99 | 0 |
| 100~199 | 1 |
| 200~299 | 2 |
| 300~399 | 3 |
| 400~499 | 4 |
| 500~599 | 5 |

FIG. 5B

| Coded Region Type | Filter Strength Evaluation Value |
|---|---|
| I picture | 5 |
| B picture not to be reffered to | 3 |
| B picture to be reffered to | 2 |
| P picture | 2 |

FIG. 5C

| Quantization Step Average | Filter Strength Evaluation Value |
|---|---|
| 1~10 | 0 |
| 11~20 | 1 |
| 21~30 | 2 |
| 31~40 | 3 |
| 41~50 | 4 |
| 51~60 | 5 |
| 61~70 | 6 |
| 71~80 | 7 |
| 80~91 | 8 |

FIG. 5D

| Coded Amount[bit] | Filter Strength Evaluation Value |
|---|---|
| 0~9999 | 0 |
| 10000~19999 | 1 |
| 20000~29999 | 2 |
| 30000~39999 | 3 |
| 40000~49999 | 4 |
| 50000~59999 | 5 |

FIG. 5E

| Sum of Motion Vectors | Filter Strength Evaluation Value |
|---|---|
| 0~999 | 0 |
| 1000~1999 | 1 |
| 2000~2999 | 2 |
| 3000~3999 | 3 |
| 4000~4999 | 4 |
| 5000~5999 | 5 |

FIG. 5F

| TotalCost | α | β |
|---|---|---|
| 0 | 0 | 0 |
| 1 | 25 | 2 |
| 2 | 50 | 4 |
| 3 | 75 | 6 |
| 4 | 100 | 8 |
| 5 | 125 | 10 |
| 6 | 150 | 12 |
| 7 | 175 | 14 |
| 8 | 200 | 16 |
| 9 | 225 | 18 |
| 10 | 255 | 18 |

FIG. 6

| INDEX | α | INDEX | α |
|---|---|---|---|
| 1 | 0 | 27 | 17 |
| 2 | 0 | 28 | 20 |
| 3 | 0 | 29 | 22 |
| 4 | 0 | 30 | 25 |
| 5 | 0 | 31 | 28 |
| 6 | 0 | 32 | 32 |
| 7 | 0 | 33 | 36 |
| 8 | 0 | 34 | 40 |
| 9 | 0 | 35 | 45 |
| 10 | 0 | 36 | 50 |
| 11 | 0 | 37 | 56 |
| 12 | 0 | 38 | 63 |
| 13 | 0 | 39 | 71 |
| 14 | 0 | 40 | 80 |
| 15 | 0 | 41 | 90 |
| 16 | 4 | 42 | 101 |
| 17 | 4 | 43 | 113 |
| 18 | 5 | 44 | 127 |
| 19 | 6 | 45 | 144 |
| 20 | 7 | 46 | 162 |
| 21 | 8 | 47 | 182 |
| 22 | 9 | 48 | 203 |
| 23 | 10 | 49 | 226 |
| 24 | 12 | 50 | 255 |
| 25 | 13 | 51 | 255 |
| 26 | 15 | | |

FIG. 7

| Substantial Quantization Parameter (Quantization Parameter Corresponding to Quantization Step) | To-be-Coded Quantization Parameter (Provisional Quantization Parameter) | Quantization Step determined by Quantization Parameter | weightScale (Scale Factor of Quantization Step) | Quantization Step | $\alpha$ | $\beta$ | INDEX |
|---|---|---|---|---|---|---|---|
| 30 | 30 | 8 | 1 | 8 | 25 | 8 | 30 |
| 30 | 24 | 4 | 2 | 8 | 12 | 4 | 24 |
| 30 | 18 | 2 | 4 | 8 | 5 | 2 | 18 |
| 30 | 12 | 1 | 8 | 8 | 0 | 0 | 12 |

CODING METHOD CONVERSION APPARATUS

BACKGROUND OF THE INVENTION (1) Field of the Invention

The present invention relates to coding method conversion apparatuses which code image information of moving pictures, and more particularly to a coding method conversion apparatus which performs variable length coding on quantized Discrete Cosine Transform (DCT) coefficients and outputs the coded data.

(2) Description of the Related Art

For technologies of coding moving pictures, coding efficiency has been improved. This allows mobile telephones to serve as television telephones having smooth moving images, capture high-quality moving pictures, and the like. With the development of coding technologies, conversion between different coding technologies has become necessary to share moving picture data between different apparatuses, to achieve long-length recording, and the like. For example, terrestrial digital television broadcast employs a moving picture coding technology called an MPEG-2 method. When TV programs provided by the above broadcast are to be recorded onto a Hard Disk Drive (HDD) recorder or the like, more programs can be recorded onto the recorder as longer-hour recording, by selecting a recording method with a coding rate lower than the MPEG-2 broadcast waves (including a change of a coding rate within the same method).

Coding apparatuses, which are represented by an apparatus which codes data by the MPEG-2 method (hereinafter, referred to as a "MPEG coding apparatus"), divide an image region into specific image blocks, perform orthogonal transformation and quantization on predictive residual signals which are generated by intra prediction or inter prediction, then perform variable length coding on the resulting signals in order to be outputted. Such coding apparatuses are liable to cause particular noise called block noise in decoded signals of the coded signals. In order to address this problem, a technology has been disclosed in which, when conversion between different coding technologies is to be performed, signals decoded from signals coded by the first coding device is applied with post filtering and block noise reduction, and then coded by the second coding unit (refer to Japanese Unexamined Patent Application Publication No. 2003-23640).

In the above technology, a coding type of the decoded signal is detected, and depending on whether the detected coding type is intra-prediction or inter-prediction, a strength of the post filtering is determined.

SUMMARY OF THE INVENTION

With the development of coding technologies, however, an H.264/AVC standard introduces an in-loop filter in an encoder in order to suppress the cause of block noise in decoded signals. This filter (hereinafter, referred to as a "deblocking filter") can be selected to: filter positions (hereinafter, referred to as a "filtering position") of both macroblock boundaries and block boundaries; filter positions of only macroblock boundaries; or be switched OFF (deblocking filtering is not performed). Furthermore, in the H.264/AVC standard, a filter strength varies in accordance with a quantization parameter, and the filter strength may be set to be offset (filter strength offset).

Therefore, if the filter strength is adjusted depending only on a coding type of a decoded signal as disclosed in the conventional technology, the filtering positions of the deblocking filter and the filter strength offset of the H.264/AVC standard cannot be determined appropriately, since the information used for the determination is only the coding type of the decoded signal.

Moreover, the block noise is generally more noticeable when image is coded by a lower coding rate, so that if the filter strength is determined using only the coding type information of the decoded signal not using other information such as rate information, a problem such as noticeable blurs in images occurs when the image is coded by a high coding rate by which an adequate coded amount is allocated to residual data.

In order to address the above problems, an object of the present invention is to provide a coding method conversion apparatus which can appropriately set filtering positions of a deblocking filter and a filter strength offset, and also prevent blurs in images even if the image is coded by a high coding rate.

In order to solve the above problems, the coding method conversion apparatus according to the present invention, converts a first coded data into a second coded data, the first coded data being coded by a first coding method. The coding method conversion apparatus includes: a decoding unit operable to decode the first coded data; a deblocking filter strength calculation unit operable to calculate a filter strength of deblocking filtering of a second coding method, using at least one piece of decoding information except a coding type of the first coded data, the decoding information being obtained by decoding the first coded data; and a deblocking filter unit operable to perform the deblocking filtering to reduce noise in a boundary of blocks according to the filter strength calculated by the deblocking filter strength calculation unit.

Note that the present invention can be implemented not only as the above coding method conversion apparatus, but also as an image information coding method which includes steps performed by units of the coding method conversion apparatus, a program which causes a computer to execute the steps, and the like. Obviously, the program can be distributed via a recording medium such as a CD-ROM or a transmission medium such as the Internet.

Thus, according to the present invention, the coding method conversion apparatus converts data coded by the first image compression coding method into data coded by the first or second image compression coding method. The coding method conversion apparatus can appropriately set filtering positions of a deblocking filter and a filter strength offset which are defined by a standard of the second image compression coding method.

FURTHER INFORMATION ABOUT TECHNICAL BACKGROUND TO THIS APPLICATION

The disclosure of Japanese Patent Application No. 2007-35877 filed on Feb. 16, 2007 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the Drawings.

DETAILED DESCRIPTION OF THE INVENTION

Figure 1:
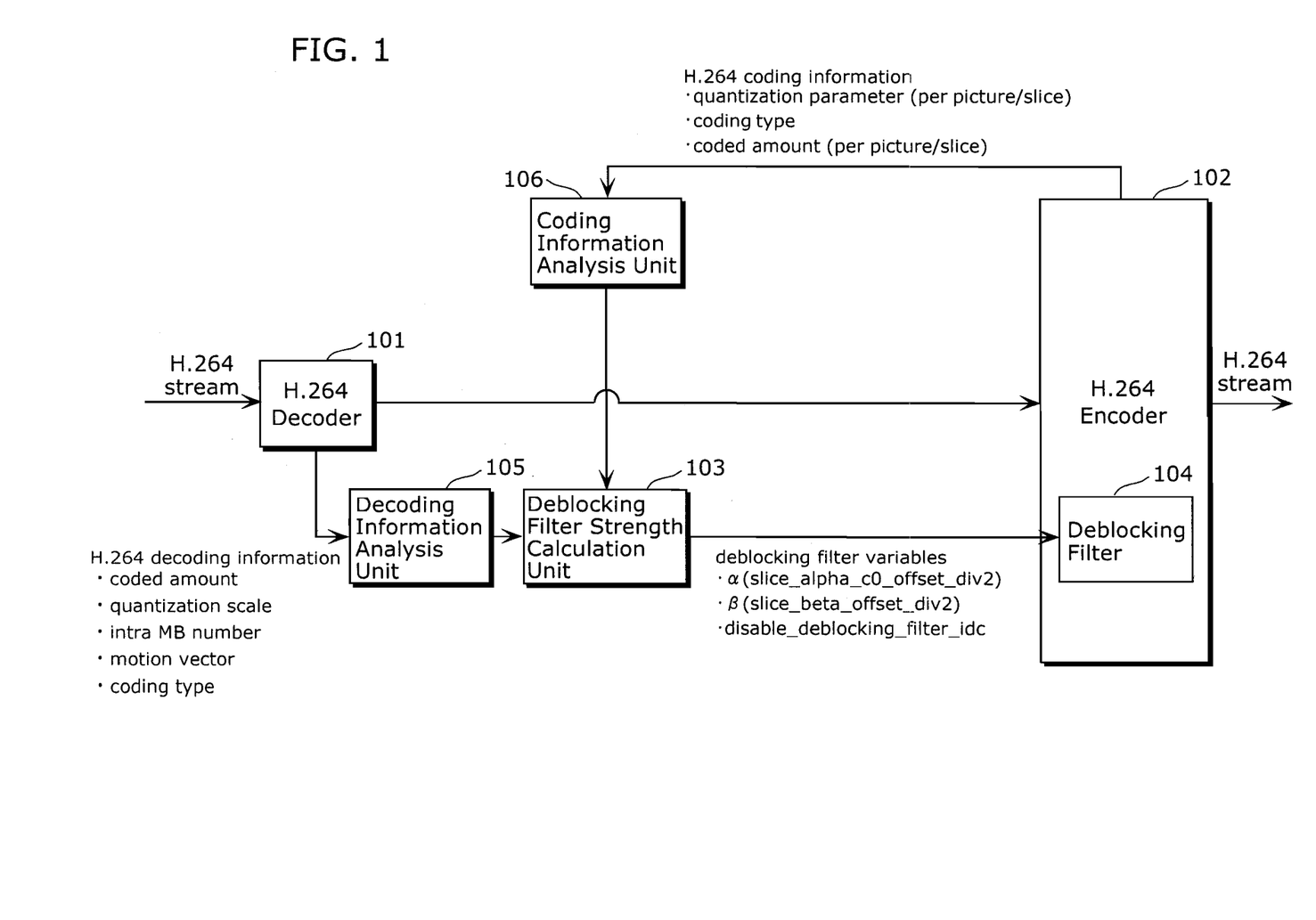
FIG. 1 is a schematic block diagram showing a structure of a coding method conversion apparatus which converts the first image compression coding method into the second image compression coding method, according to an embodiment of the present invention.

FIG. 1 is a schematic block diagram showing a structure of a coding method conversion apparatus according to an embodiment of the present invention. The schematic block diagram converts the first image compression coding method into the second image compression coding method, in other words, converts image coded by the first image compression coding method into image coded by the second image compression coding method. Here, the first image compression coding method is assumed to be a low-resolution H.264/AVC method, and the second image compression coding method is assumed to be a high-resolution H.264/AVC method The coding method conversion apparatus according to the present embodiment of FIG. 1 determines a strength and filtering positions of a deblocking filter in an encoder, based not only on a coding type of a decoded signal but also on other information. The coding method conversion apparatus of FIG. 1 includes an H.264 decoder 101, an H.264 encoder 102, a deblocking filter strength calculation unit 103, a deblocking filter 104, a decoding information analysis unit 105, and a coding information analysis unit 106. Note that it has been described that the coding method conversion apparatus has the H.264 decoder 101 and that the first image compression coding method is the H.264/AVC method, but the present invention is not limited to the above and the H.264 decoder 101 may be replaced by a MPEG-2 decoder and the first image compression coding method may be the MPEG-2 method.

The H.264 decoder 101 is one example of a decoding unit which decodes the first coded data. The H.264 decoder 101 decodes high-compression, low-resolution H.264 streams, for example. The decoding information analysis unit 105 is one example of a decoding information analysis unit which calculates, as the at least one of the pieces of decoding information (hereinafter, referred to also as "H.264 decoding information"), at least one of (i) a coded amount, (ii) an average value of quantization parameters, (iii) the number of intra-predicted macroblocks (hereinafter, referred to as an "intra MB number"), and (iv) a sum of absolute values of motion vectors or a simple sum of the motion vectors, using a syntax element and additional information which are obtained by decoding the first coded data. The decoding information analysis unit 105 extracts H.264 decoding information from a decoded low-resolution H.264 stream, and stores the extracted information into a memory in the deblocking filter strength calculation unit 103. The H.264 decoding information includes a coded amount, a quantization scale (quantization parameter), an intra MB number, motion vectors (absolute value sum or simple sum), and a coding type (picture type or slice type). In more detail, the decoding information analysis unit 105 stores respective decoded each SyntaxElement into the memory in the decoding information analysis unit 105. The SyntaxElement denotes overall information which is recorded and/or transmitted in the coding. As total information of the SyntaxElements, the decoding information analysis unit 105 calculates (i) an average value of quantization scales, (ii) intra MB number, (iii) motion vectors (absolute value sum or simple sum), and (iv) a coding type, per predetermined unit such as a coded amount or a picture, and then stores these information into the memory in the deblocking filter strength calculation unit 103 per the predetermined unit. It should be noted that a coded amount has been described to be obtained from the SyntaxElement, but the method of obtaining coded amounts is not limited to the above and coded amounts may be obtained from header information of the streams. It should also be noted that the information has been described to be managed per picture, but the information may be managed per smaller or larger unit. For example, the information may be managed per macroblock, macroblock line, slice, field, frame, or the like. The same goes for the case where the first image compression coding method is the MPEG-2 method and therefore MPEG-2 decoding information is analyzed. The decoding information analysis unit 105 generates an evaluation value from the extracted H.264 decoding information in order to determine a strength of deblocking filtering performed by the deblocking filter 104, and then provides the generated evaluation value to the deblocking filter strength calculation unit 103. Here, the H.264 decoding information is managed per picture, but may be managed per smaller or larger unit. For example, the decoding information analysis unit 105 manages the H.264 decoding information per macroblock, macroblock line, or the like.

Next, the coding information analysis unit 106 is one example of a coding information analysis unit which calculates, as coding information (hereinafter, referred to also as "H.264 coding information"), one of (i) an average value of quantization parameters, (ii) a target coded amount, and (iii) a target coding rate, using a syntax element and additional information which are obtained when the second coded data is generated. As H.264 coding information, the coding information analysis unit 106 obtains, from the H.264 encoder, quantization parameters, a coding type, a target coded amount, a target coding rate, and the like, per picture or slice. Then the coding information analysis unit 106 stores the obtained information into the memory of the deblocking filter strength calculation unit 103 per picture or slice. More specifically, into the memory of the deblocking filter strength calculation unit 103, the coding information analysis unit 106 stores respective SyntaxElements regarding coding of the H.264 encoder. In more detail, as total information obtained from the SyntaxElements and additional information which is header information of the stream, the coding information analysis unit 106 stores, per predetermined unit such as a picture, (i) an average value of quantization parameters, (ii) a target coded amount, and (iii) a target coding rate, into the memory of the deblocking filter strength calculation unit 103. In addition, from the H.264 coding information which is obtained from the H.264 encoder, the coding information analysis unit 106 generates an evaluation value for determining a strength of deblocking filtering, and outputs the generated evaluation value to the deblocking filter strength calculation unit 103.

The deblocking filter strength calculation unit 103 is one example of a deblocking filter strength calculation unit which calculates a filter strength of deblocking filtering of a second coding method (the second image compression coding method), using at least one piece of decoding information except a coding type of the first coded data, the decoding information being obtained by decoding the first coded data. The deblocking filter strength calculation unit 103 determines parameters regarding a strength of the deblocking filtering, which are slice_alpha_c0_offset_div2 (hereinafter, referred to as "α") and slice_beta_offset_div2 (hereinafter, referred to as "β"). The deblocking filter 104 is one example of a deblocking filter unit which performs the deblocking filtering to reduce noise in a boundary of blocks according to the filter strength calculated by the deblocking filter strength calculation unit. The deblocking filter 104 reduces high frequency components in block boundaries. It should be noted that the deblocking filter strength calculation unit 103 has been described to store the H.264 decoding information and the H.264 coding information per picture or slice, but these information may be stored per smaller or larger unit.

Figure 2:
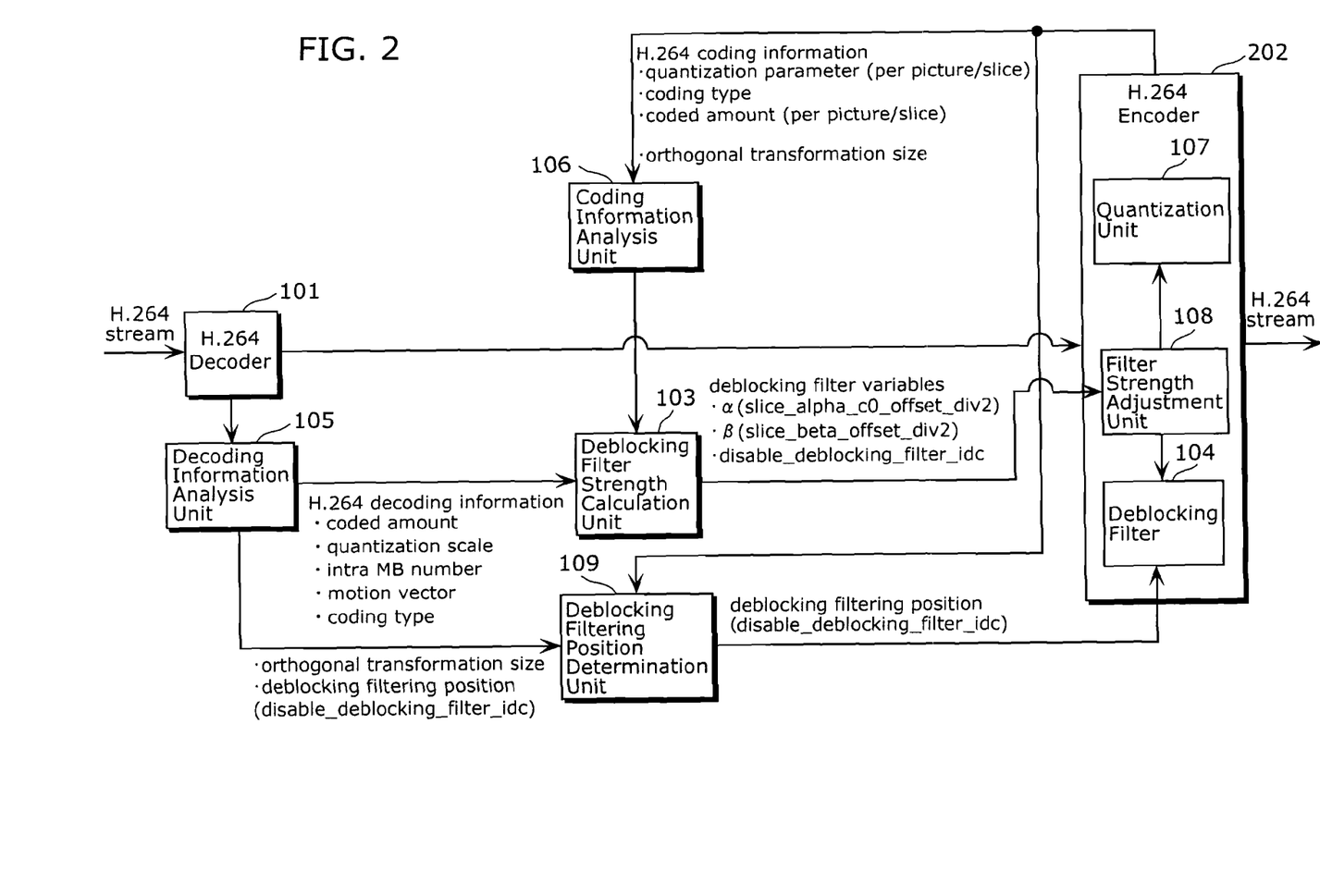
FIG. 2 is a block diagram showing another example of the structure of the coding method conversion apparatus, which is basically same as the coding method conversion apparatus of FIG. 1 but further includes a processing unit for determining a position on which deblocking filtering is performed.

FIG. 2 is a block diagram showing another example of the structure of the coding method conversion apparatus according to the embodiment of the present invention. The structure of the coding method conversion apparatus of FIG. 2 is basically the same as the structure of the coding method conversion apparatus of FIG. 1. However, the coding method conversion apparatus of FIG. 2 further includes a processing unit for determining a position on which the deblocking filtering is performed, and the H.264 encoder has a different structure. In more detail, the coding method conversion apparatus of FIG. 2 differs from the coding method conversion apparatus of FIG. 1 in that the coding method conversion apparatus of FIG. 2 includes a deblocking filtering position determination unit 109 in addition to the H.264 decoder 101, the deblocking filter strength calculation unit 103, the deblocking filter 104, the decoding information analysis unit 105, and the coding information analysis unit 106, and that the H.264 encoder 102 is replaced by the H.264 encoder 202. The H.264 encoder 202 of FIG. 2 differs from the H.264 encoder 102 of FIG. 1 in that the H.264 encoder 202 includes a quantization unit 107 and a filter strength adjustment unit 108 in addition to the deblocking filter 104. The deblocking filtering position determination unit 109 determines parameters deblocking_filter_control_present_flag (hereinafter, referred to as "CFLAG") and disable_deblocking_filter_idc (hereinafter, referred to as "IDC"), based on the H.264 decoding information obtained from the decoding information analysis unit 105 and the H.264 coding information obtained from the H.264 encoder 202. Hereinafter, the four parameters "α", "β", "CFLAG", and "IDC" are called deblocking filter strength variables. Here, CFLAG is a parameter indicating whether or not IDC is to be transmitted in the H.264 stream. IDC is a parameter indicating a position of image on which the deblocking filtering is performed as follows: if a value of IDC is 0, the deblocking filtering is performed on block boundaries and macroblock boundaries; if the value of IDC is 1, no deblocking filtering is performed; and if the value of IDC is 2, the deblocking filtering is not performed in slice boundaries.

Figure 3A:
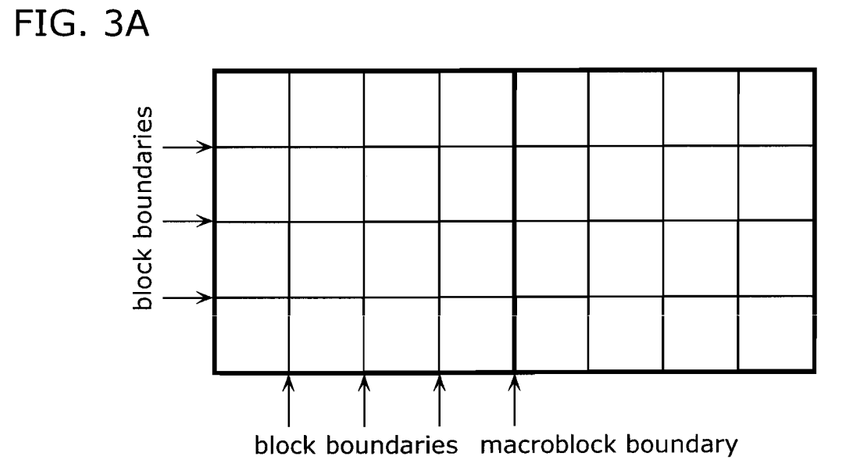
FIG. 3A is a diagram showing one example of deblocking filtering positions in the case where deblocking filtering is performed on the H.264 deblocking filtering positions which are determined by a deblocking filtering position determination unit based on decoding information obtained from a decoding information analysis unit.

FIG. 3A is a diagram showing one example of deblocking filtering positions in the case where deblocking filtering is performed on the H.264 deblocking filtering positions which are determined by the deblocking filtering position determination unit 109 based on the H.264 decoding information obtained from the decoding information analysis unit 105. For example, when the coding method conversion apparatus converts high-compression low-resolution H.264 moving picture data into high-resolution H.264 moving picture data, the deblocking filtering position determination unit 109 determines deblocking filtering positions so that deblocking filtering is performed on more block boundaries. For instance, if IDC obtained from the decoding information analysis unit 105 is 1, the deblocking filtering position determination unit 109 determines deblocking filtering positions so that IDC of the deblocking filter 104 becomes 0.

Figure 3B:
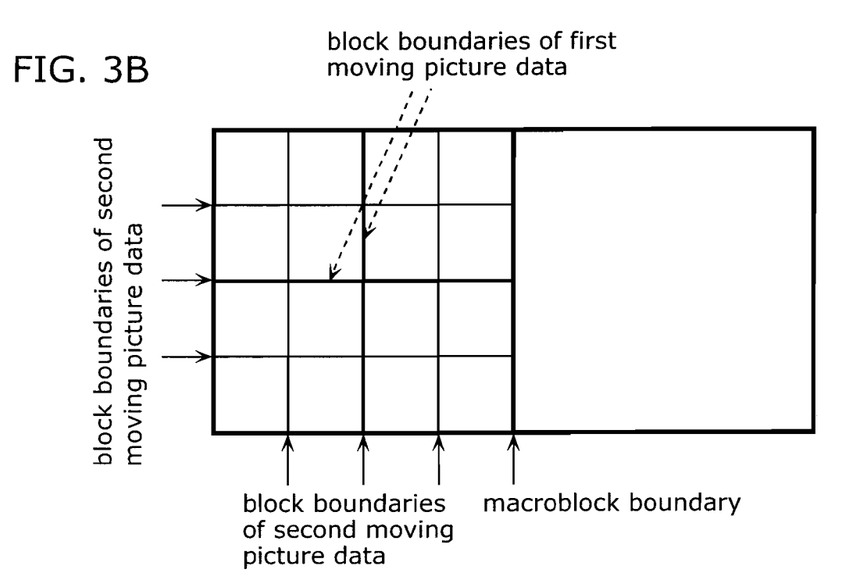
FIG. 3B is a diagram showing one example of deblocking filtering positions which are determined by the deblocking filtering position determination unit based on (i) block boundaries of the first moving image data which are obtained from the decoding information analysis unit, and (ii) block boundaries of the second moving image data which are obtained from an H.264 encoder.

FIG. 3B is a diagram showing one example of deblocking filtering positions which are determined by the deblocking filtering position determination unit 109 based on (i) block boundaries of the first moving image data which are obtained from the decoding information analysis unit 105, and (ii) block boundaries of the second moving image data which are obtained from the H.264 encoder 202. The deblocking filtering position determination unit 109 is one example of a first deblocking filtering position determination unit which determines, as a deblocking filtering position on which the deblocking filtering is to be performed, a boundary of blocks whose block size is one of the block size obtained by the decoding information analysis unit and the block size obtained by the coding information analysis unit. FIG. 3B shows (i) block boundaries of image which is divided into blocks each having an orthogonal transform size for which an orthogonal transform is performed by the first image compression coding method and (ii) block boundaries of image which is divided into blocks each having an orthogonal transform size for which orthogonal transform is performed by the second image compression coding method. Here, it is assumed that a macroblock is 16×16 pixels, that the orthogonal transform size of the first image compression coding method is 8×8 pixels, and that the orthogonal transform size of the second image compression coding method is 4×4 pixels.

In general, block noise occurs in pixel boundary positions of the orthogonal transform size. In this case, deblocking filtering is performed on boundary positions of 4×4-pixel blocks of the orthogonal transform size of the second image compression coding method, thereby reducing the block noise together with block noise in 8×8-pixel blocks of the orthogonal transform size of the first image compression coding method. However, when a macroblock is 16×16 pixels, the orthogonal transform size of the first image compression coding method is 8×8 pixels, and the orthogonal transform size of the second image compression coding method is 4×4 pixels, even if deblocking filtering is performed according to the orthogonal transform size of the second image compression coding method, it is not possible to reduce the block noise for the orthogonal transform size of the first image compression coding method. Therefore, according to the present invention, the deblocking filtering is performed according to the smaller orthogonal transform size of the orthogonal transform sizes of the first and second image compression coding methods, which makes it possible to reduce block noise for both of the orthogonal transform sizes.

Figure 4:
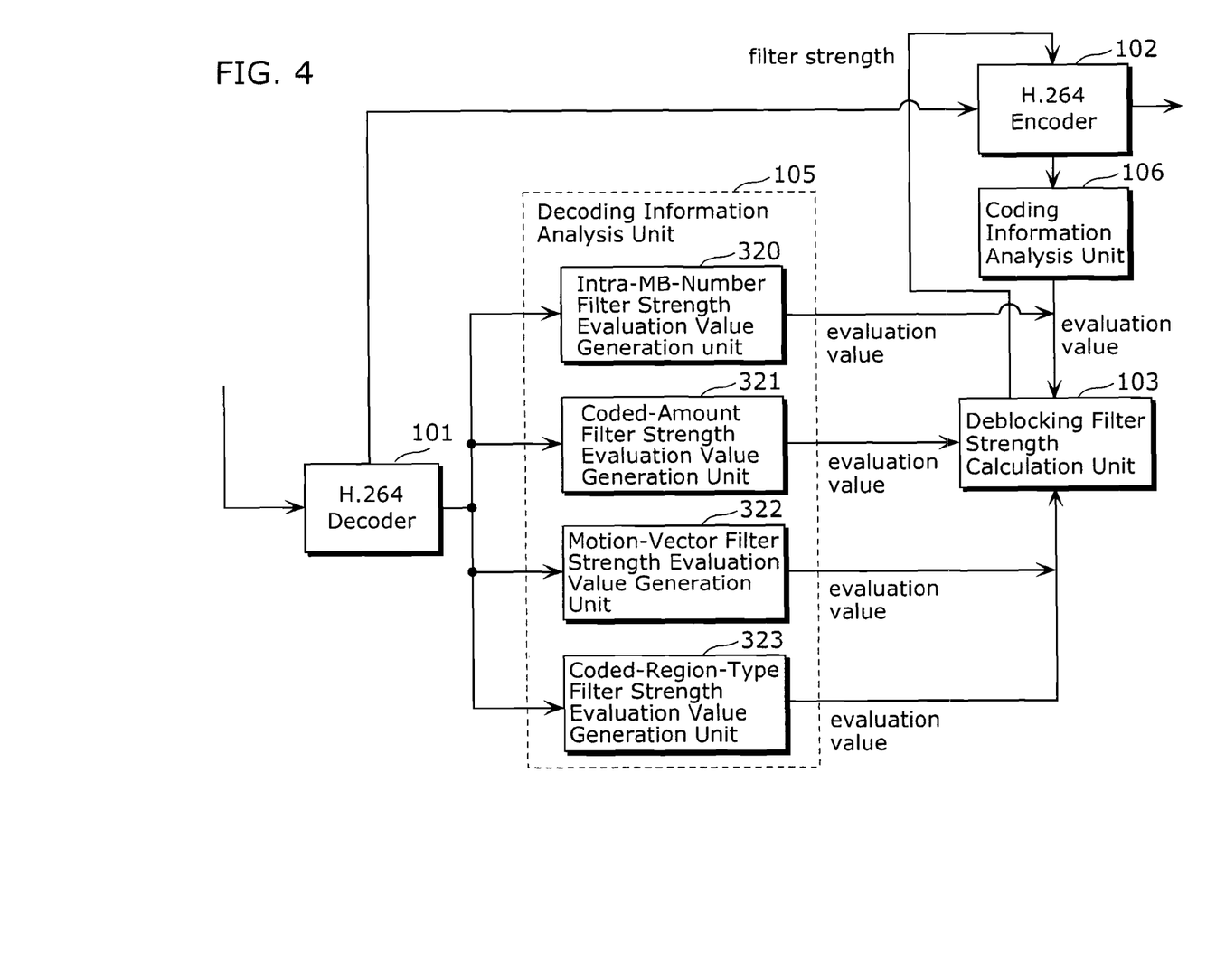
FIG. 4 is a block diagram showing a structure of the decoding information analysis unit of FIG. 1 in more detail.

FIG. 4 is a block diagram showing a structure of the decoding information analysis unit 105 of FIG. 1 in more detail. As shown in FIG. 4, the decoding information analysis unit 105 of FIG. 1 includes an intra-MB-number filter strength evaluation value generation unit 320, a coded-amount filter strength evaluation value generation unit 321, a motion-vector filter strength evaluation value generation unit 322, a coded-region-type filter strength evaluation value generation unit 323.

In FIG. 4, each information of an intra MB number, a coded amount and a quantization scale (quantization step), a motion vector, a picture type or slice type is inputted to the corresponding filter strength evaluation value generation unit which evaluates the input information. In more detail, the intra MB number is inputted into the intra-MB-number filter strength evaluation value generation unit 320. The coded amount and the quantization step are inputted into the coded-amount filter strength evaluation value generation unit 321. The motion vector is inputted into the motion-vector filter strength evaluation value generation unit 322. The picture type or slice type is inputted into the coded-region-type filter strength evaluation value generation unit 323. Likewise, a quantization parameter per picture or slice, a picture type, a slice type, a target coding rate per sequence, a target coded amount per picture, which are obtained from the H.264 encoder 102 are inputted into an image coding information filter strength evaluation value generation unit 313 (not shown). The deblocking filter strength calculation unit 103 generates a total evaluation value (total cost), by performing a weighted addition on the five evaluation values obtained from the five filter strength evaluation value generation units 320, 321, 322, 323, and 313, in other words, by weighting the respective evaluation values and added the weighted values together (hereinafter, this operation is referred to as the "weighted addition"). The deblocking filter strength calculation unit 103 searches an internal table for a filter strength corresponding to the generated total evaluation value, and then outputs the obtained filter strength to the H.264 encoder 102. In the internal table, a total evaluation value is previously associated with a filter strength (α, β).

It should be noted that the coding method conversion apparatus of FIG. 2 has been described to determine the deblocking filtering positions by the deblocking filtering position determination unit 109 which is included in the coding method conversion apparatuses specifically for the determination. In the above example, however, the deblocking filter strength calculation unit 103 of FIG. 1 performs the functions of both of the deblocking filter strength calculation unit 103 of FIG. 2 and the deblocking filtering position determination unit 109 of FIG. 2. More specifically, the filter strength outputted from the deblocking filter strength calculation unit 103 of FIG. 1 is equivalent to a set of CFLAG, IDC, α, and β. The filter strength also includes information of filtering positions.

The following describes processing performed by each of the filter strength evaluation value generation units 320, 321, 322, and 323 in detail. FIGS. 5A to 5F are tables each showing one example of a filter strength evaluation value table held by the corresponding filter strength evaluation value generation unit and the deblocking filter strength calculation unit 103. Each of the filter strength evaluation value generation units previously performs simulation to generate a database of relationships between various input information (quantization scale, for example) and filter strengths, thereby generating a table which indicates an optimum relationship between the input information and the filter strength. Each of the filter strength evaluation value generation units calculates a filter strength evaluation value by searching the table for a filter strength evaluation value according to the input information (hereinafter, referred to also as "performing table search").

<Filter Strength Evaluation Value Calculation Based on Intra MB Number>

Figure 5A:
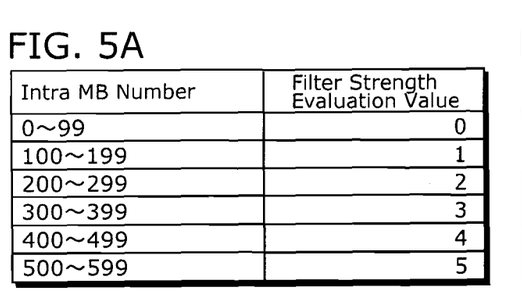
FIG. 5A is a table showing one example of a filter strength evaluation value table which an intra-MB-number filter strength evaluation value generation unit holds.

FIG. 5A is a table showing one example of a filter strength evaluation value table which the intra-MB-number filter strength evaluation value generation unit 320 holds. In the first image compression coding method, when the intra MB number is large, block noise is likely to be noticeable. While in the H.264 method the orthogonal transformation is performed on prediction errors in intra-prediction, in the MPEG image coding method the orthogonal transformation is performed directly on input pixel so that the resulting data amount is larger than the H.264 method. Here, if the data amount is reduced, quantization errors is likely to be noticeable. Under such circumstances, by increasing a strength of the deblocking filtering in the H.264 encoder 102 of the second image compression coding method, block noise can be reduced. In the case where the intra MB number exceeds a predetermined threshold value in the first image compression coding method, the intra-MB-number filter strength evaluation value generation unit 320 increases a strength of the deblocking filtering in the second image compression coding method. The case where the intra MB number exceeds the predetermined threshold value means the case where more than three fourth (¾) of macroblocks in the image are intra macroblocks. The case may be the case where more than ¾ of macroblocks in a rectangular region positioned at the center of the image are intra macroblocks. In such a case, the intra-MB-number filter strength evaluation value generation unit 320 can calculate a filter strength evaluation value by searching the filter strength evaluation value table of FIG. 5A for the filter strength evaluation value according to the intra MB number obtained from the decoding information.

<Filter Strength Evaluation Value Calculation based on Coded Region Type>

Figure 5B:
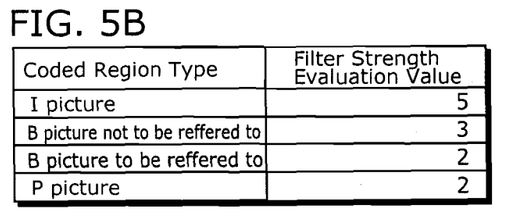
FIG. 5B is a table showing one example of a filter strength evaluation value table which a coded-region-type filter strength evaluation value generation unit holds.

FIG. 5B is a table showing one example of a filter strength evaluation value table which the coded-region-type filter strength evaluation value generation unit 323 holds. For example, the coded-region-type filter strength evaluation value generation unit 323 searches the filter strength evaluation value table of FIG. 5B for a filter strength evaluation value of the H.264 encoder 102 according to the picture type of the first image compression coding method. For example, if a picture type of a target picture in the first image compression coding method is an I picture, the target picture has been intra-predicted, so that quantization error becomes noticeable for the same reason as the calculation based on intra MB number. In this case, since the increase of a strength of the deblocking filtering can reduce block noise, a filter strength evaluation value 5 is calculated and outputted by performing table search on the filter strength evaluation value table.

<Filter Strength Evaluation Value Calculation based on Quantization Scale>

Figure 5C:
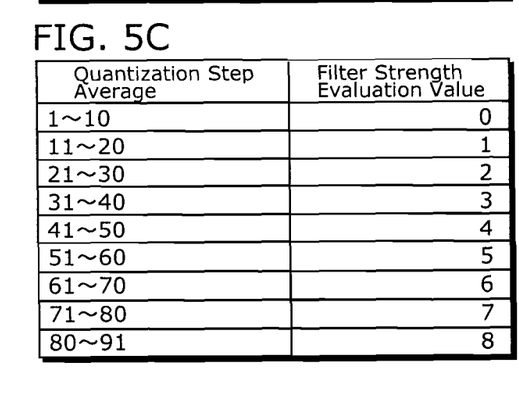
FIG. 5C is a table showing one example of a filter strength evaluation value table which a coded-amount filter strength evaluation value generation unit holds.

FIG. 5C is a table showing one example of another filter strength evaluation value table which the coded-amount filter strength evaluation value generation unit 321 holds. The deblocking filter strength calculation unit 103 is one example of a deblocking filter strength calculation unit which calculates a higher filter strength as the average value of the quantization parameters is larger, the average value being the piece of the decoding information. If quantization is performed roughly by the first image compression coding method, in other words, if a quantization step is larger, block noise is more likely to be noticeable in decoded signals. If the quantization parameter is large as the above case, the deblocking filter strength calculation unit 103 increases a strength of the deblocking filtering by the second image compression coding method. In order to achieve this, the coded-amount filter strength evaluation value generation unit 321 sets a threshold value of the quantization step according to the characteristics of the first image compression coding method as shown in a table of FIG. 5C, and compares the quantization step to the threshold value. If the quantization step exceeds the threshold value, the coded-amount filter strength evaluation value generation unit 321 outputs a filter strength evaluation value for increasing the strength of the deblocking filtering according to the characteristics of the second image compression coding method. Finally, the deblocking filter strength calculation unit 103 performs comprehensive evaluation of these filter strength evaluation values obtained from the respective filter strength evaluation value generation units, by executing a weighted addition on them. Thereby, the strength of the deblocking filtering is increased so that the deblocking filtering is adjusted for both of the first and second image compression coding methods. As a result, block noise can be reduced. In general, block noise is likely to occur in image region boundaries per image coding processed unit. Examples of the boundaries are boundaries between macroblocks, boundaries between blocks each having an orthogonal transform size, and the like. Therefore, high efficiency is achieved by switching positions on which the deblocking filtering is performed by the second image compression coding method, according to the image coding processed units and the orthogonal transform sizes of the first and second image compression coding methods.

As shown in FIG. 5C, if the quantization scale of the first image compression coding method is smaller than a threshold value of 10, the filter strength evaluation value is set to 0, and if the quantization scale of the first image compression coding method is greater than a threshold value of 11 and smaller than a threshold value of 20, the filter strength evaluation value is set to 1. According to the filter strength evaluation value, an actual filter strength to be used is determined. The filter strength may be proportional to the filter evaluation value, or may be varied according to a function. Furthermore, a weighted addition may be performed on the filter strength and other filter strengths, in other words, the filter strength and other filter strengths are weighted respectively and then the respective weighted values are added together. It should be noted that the table search has been described above, but it may be a function such as approximation line representing the table search.

<Filter Strength Evaluation Value Calculation based on Complexity>

Figure 5D:
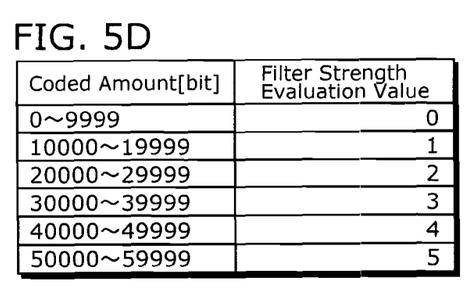
FIG. 5D is a table showing one example of another filter strength evaluation value table which the coded-amount filter strength evaluation value generation unit holds.

FIG. 5D is a table showing one example of a filter strength evaluation value table which the coded-amount filter strength evaluation value generation unit 321 holds. This filter strength evaluation value table is a table which indicates a relationship between (i) a complexity that is calculated by multiplying a quantization scale by a coded amount and (ii) a filter strength evaluation value. The deblocking filter strength calculation unit 103 is one example of a deblocking filter strength calculation unit which calculates a higher filter strength as a value of a complexity is larger, the value of the complexity being calculated by performing an arithmetic operation on (i) the average value of the quantization parameters and (ii) the coded amount each of which is the piece of the decoding information. If in the first image compression coding method the complexity which is calculated by multiplying a quantization scale by a coded amount is larger, in other words, it is more difficult to compress a target image, block noise is more likely to be noticeable. In such a situation, by increasing a strength of the deblocking filtering in the second image compression coding method, it is possible to reduce the block noise. On the other hand, if the multiplication of the quantization scale by the coded amount is smaller, in other words, it is easier to compress the target image, block noise is more unlikely to occur. In such a situation, if the deblocking filtering is performed on the image, blurs occur in block boundaries of the image. Therefore, in the situation, the deblocking filtering is not applied, or the filter strength is decreased according to the complexity. The multiplication of a quantization scale by a coded amount is generally called a complexity which represents a complexity of an image. It should be noted that the calculation of the complexity may be simplified by performing a weighted addition on the quantization scale and the coded amount. Or, the calculation may be a predetermined simple arithmetic operation using a function. It should be also noted that the filter strength evaluation value may be calculated by generating the table as shown in FIG. 5D, in the same manner as described for the calculation based on the quantization scale.

<Filter Strength Evaluation Value Calculation based on Sum of Motion Vectors>

Figure 5E:
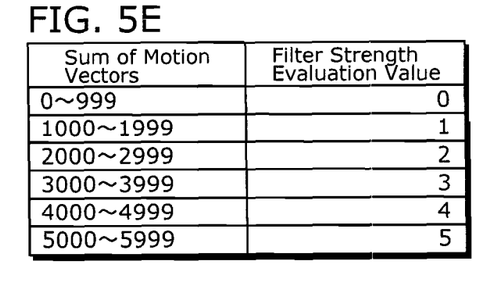
FIG. 5E is a table showing one example of a filter strength evaluation value table which a motion-vector filter strength evaluation value generation unit holds.

FIG. 5E is a table showing one example of a filter strength evaluation value table which the motion-vector filter strength evaluation value generation unit 322 holds. The deblocking filter strength calculation unit 103 is one example of a deblocking filter strength calculation unit which calculates a higher filter strength as the sum of absolute values of the motion vectors or the simple sum of the motion vectors is larger, the sum or the simple sum being the piece of the decoding information. If in the first image compression coding method a sum of motion vectors is larger per picture or slice, in other words, an overall image is moved in a certain direction more, the motion vectors do not indicate correct blocks, so that block noise is more likely to be noticeable. In such a situation, by increasing a strength of the deblocking filtering in the second image compression coding method, it is possible to reduce the block noise. It should be noted that the filter strength evaluation value may be calculated by generating the table as shown in FIG. 5E, in the same manner as described for the calculation based on the quantization scale.

It should also be noted that the image-coding-information filter strength evaluation value generation unit 313 (not shown) may hold a filter strength evaluation value table regarding respective coding information in the same manner as described above, thereby calculate a filter strength evaluation values from each coding information, and then outputs the calculated value to the deblocking filter strength calculation unit 103.

<Filter Strength Determination>

Figure 5F:
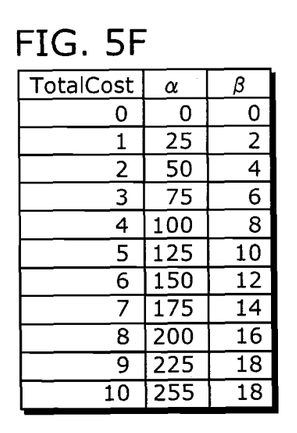
FIG. 5F is a table showing one example of a table which a filter strength determination unit holds.

FIG. 5F is a table showing one example of a table which the filter strength determination unit holds. FIG. 5F indicates a relationship between (i) a value of a weighted addition (hereinafter, referred to as a "weighted addition value") performed on filter strength evaluation values outputted from respective filter strength evaluation value generation units, and (ii) a filter strength. For example, in the deblocking filter strength calculation unit 103, the evaluation value based on the sum of motion vectors, the evaluation value based on the intra MB number, the evaluation value based on the complexity, the evaluation value based on the quantization scale are denoted as MVCost, IntraCost, ComplexityCost, and QuantCost, respectively. Further, a weighted addition value of these evaluation values is denoted as TotalCost.

TotalCost is determined by the following equation.

$$TotalCost = a0 \times MVCost + a1 \times IntraCost + a2 \times ComplexityCost + a3 \times QuantCost$$

Here, each of a0, a1, a2, and a3 represents a coefficient of weighting for the corresponding evaluation value.

These coefficients may be set arbitrarily, taking into account influence to images.

Since block noise resulting from quantization errors generally becomes more dominant when a coding rate is lower, a weight of a coefficient having more influence is preferably set to be larger. For example, a0=0, a1=0, a2=1, and a3=1.

<Filter Strength Adjustment>

Figure 6:
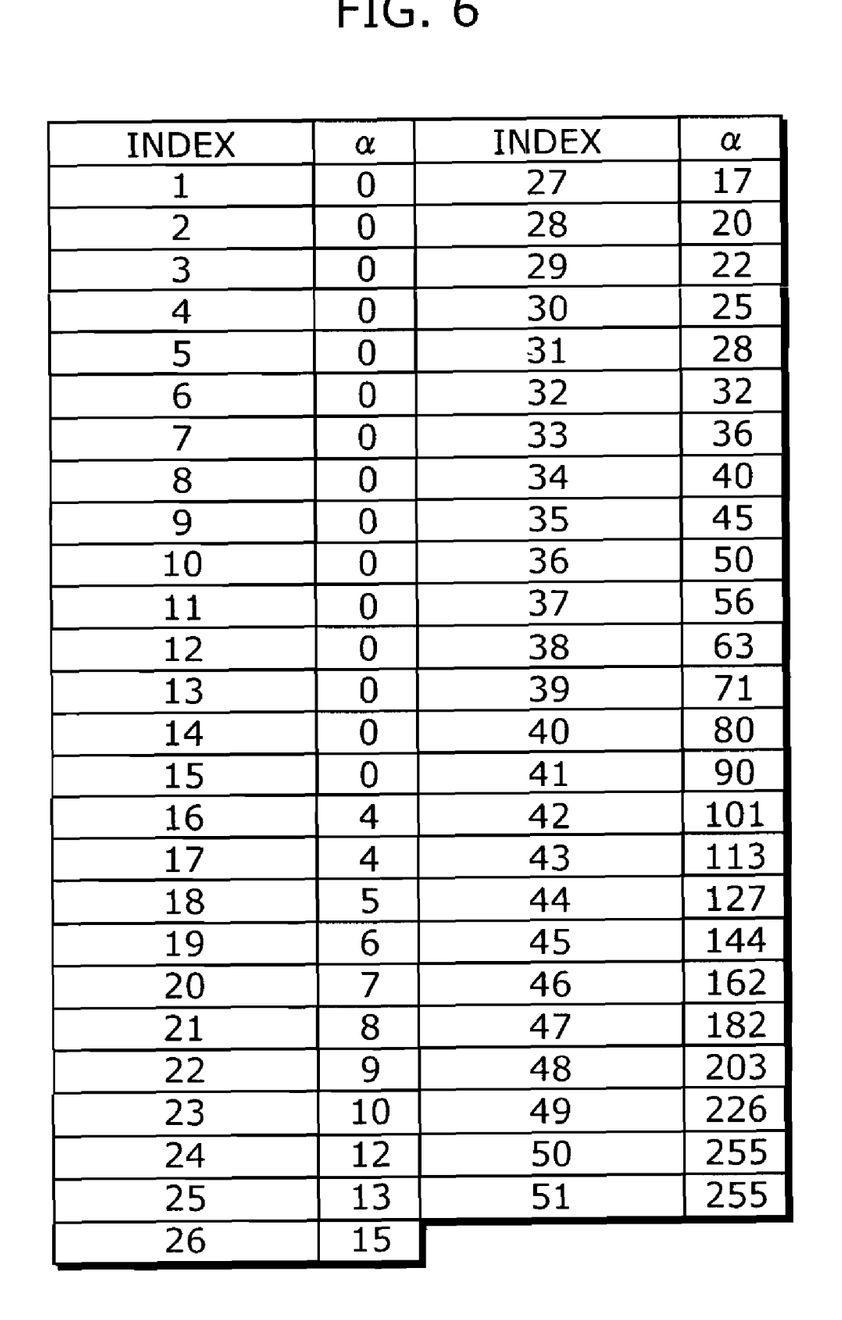
FIG. 6 is a table showing a relationship between INDEX and a filter strength α.

The filter strength adjustment unit 108 is one example of a filter strength adjustment unit which (i) selects a quantization parameter which does not change the filter strength and whose value is within a range defined by a standard of the second coding method, (ii) multiplies a quantization step which is determined by the selected quantization parameter, by a quantization matrix which is a scale factor of the quantization step, and (iii) adjusts the filter strength, by adjusting the multiplied quantization step to have a value corresponding to a quantization parameter corresponding to the filter strength calculated by the deblocking filter strength calculation unit, when the quantization parameter corresponding to the filter strength is beyond the range. The H.264 encoder 102 is one example of a coding unit which codes the quantization parameter which is selected by the filter strength adjustment unit, and a value of the quantization matrix which is used in the multiplying. More specifically, if disable_deblocking_filter_idc is not 1, in other words, if the deblocking filtering is to be performed, the filter strength adjustment unit 108 calculates an initial value of a filtering strength, by searching the table for the initial value of the filtering strength according to a quantization parameter (QP). According to the calculated initial value, it is possible to finely adjust the filter strength using the above FilterOffsetA and FilterOfsetB. Each of FilterOffsetA and FilterOfsetB is an integer value ranged from 6 to −6, thereby allowing total thirteen-stage adjustment. Here, a filter strength, which is determined from a value of an INDEX in FIG. 5F that is calculated by adding a quantization parameter (QP) of the initial value and FilterOffsetA, is represented as initial filter strength α, or simply α. Moreover, a filter strength, which is determined from a value of an INDEX in FIG. 5F that is calculated by adding the quantization parameter (QP) and FilterOffsetB, is represented as β. An example is given below. If the quantization parameter is 30 and FilterOffsetA is 1, a value of the INDEX becomes 30+1=31, so that an initial filter strength α in the case of quantization parameter=31 is set. FIG. 6 is a table showing a relationship between the INDEX and the filter strength α. In FIG. 6, each INDEX is a quantization parameter to be coded. This means that, if the quantization parameter is 30, only an initial filter strength corresponding to a quantization parameter ranged from 24 to 36 can be set. β is determined in the same manner as α. Moreover, the H.264 method has a quantization matrix called weightScale. This is a technique for setting, for quantization processing, a scale factor of quantization step per a frequency component of a DCT coefficient. Using this technique, even if a quantization parameter is smaller than 30, by increasing weightScale it is possible to perform quantization using a quantization scale in the case of quantization parameter=36. In the H.264 method, it is set that, when a quantization parameter is increased by 6, a quantization step becomes double. That is, even if the quantization parameter is 30, by setting weightScale to be double, the quantization step can be set for the case where the quantization parameter is 36. Originally, weightScale has been introduced to change a quantization step per a frequency component of a DCT coefficient, protect a coefficient of a specific frequency component using quantization, and thereby improve subjective image quality. In the present invention, the technique is used for other purpose of extending a setting range of the strength of the deblocking filtering. Next, the above is explained again using a simplified equation. Since in the H.264 method it is set that a quantization step becomes double value when a quantization parameter is increased by 6, a function for converting a quantization parameter into a quantization step is determined by the following equation.

$$Qstep(QP) = weightScale \times const \times 2^{((QP-QP\%6)/6)}$$

Here, weightScale represents a scale factor of a quantization step, const represents a constant, QP % 6 represents a remainder of dividing QP by 6.

According to the above equation, Qstep (30) where weightScale=2 is as follows.

$$Qstep(30) = 2 \times const \times 2^{((30-30\%6)/6)} = 2 \times const \times 2^5 = const \times 2^6$$

Furthermore, Qstep (36) where weightScale=1 is as follows.

$$Qstep(36) = 1 \times const \times 2^{((36-36\%6)/6)} = const \times 2^6$$

As a result, Qstep (30) where weightScale=2 becomes equal to Qstep (36) where weightScale=1.

Conventionally, if coding is to be performed by a quantization parameter (QP) of 36, only an initial filter strength corresponding to a quantization parameter (QP) ranged from 30 to 42 can be set. However, using the above fact, by setting weightScale=2 and QP=30, an initial filter strength corresponding to a quantization parameter (QP) ranged from 24 to 36 can be set. Likewise, by setting weightScale=½ and QP=36, an initial filter strength corresponding to a quantization parameter (QP) ranged from 30 to 42 can be set.

In other words, by changing weightScale, it is possible to change a provisional QP (quantization parameter to be coded), while the quantization step is kept to be correspond to a substantial quantization parameter of 30. Thereby, a filter strength can be set within a wider range, still satisfying the standard.

Figure 7:
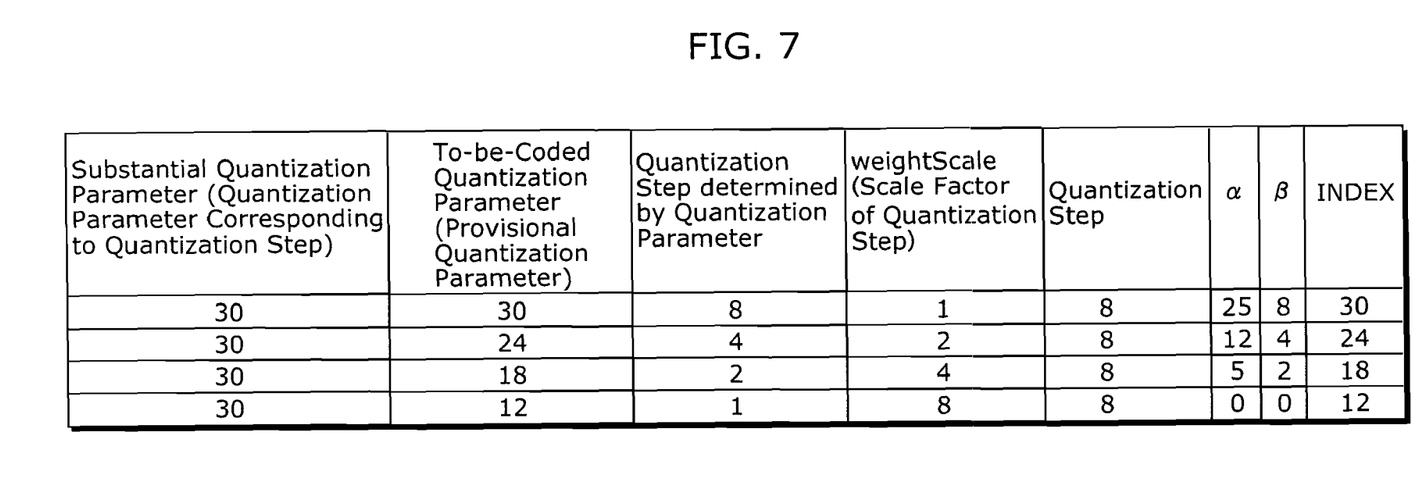
FIG. 7 is a table showing a relationship between a weight-Scale and a filter strength in the case where a value of a substantial quantization parameter is 30.

Using the filter strengths α and β which are determined by the deblocking filter strength calculation unit 103, the filter strength adjustment unit 108 determines a quantization matrix, a quantization parameter, FilterOffsetA, and FilterOffsetB. Then, the quantization unit performs quantization, and the deblocking filter unit performs deblocking filtering. If the filter strengths α and β are within a range so that the filter strengths α and β can be set using the quantization parameter, FilterOffsetA, and FilterOffsetB which are determined by the H.264 encoder, the H.264 encoder 102 codes α and β, and FilterOffsetA and FilterOffsetB which are determined by the quantization parameter. On the other hand, if the filter strengths α and β are beyond the range, coding is performed using a value of (i) a quantization parameter and (ii) a quantization matrix. The value is obtained from a table for determining the quantization parameter and the quantization matrix according to previously-generated α and β. There are a plurality of combinations of a quantization parameter and a quantization matrix in order to set an identical filter strength, so that the table is not limited to the shown table. However, for the standard characteristics, it is preferable that the combination has a much smaller difference between the quantization parameter and a quantization parameter of an immediately prior macroblock. This is because a quantization parameter is coded as a value of difference between the quantization parameter and its prior macroblock. The filter strength adjustment unit 108 is one example of the filter strength adjustment unit which (i) selects a quantization parameter which does not change the filter strength and whose value is within a range defined by a standard of the second coding method, (ii) multiplies a quantization step which is determined by the selected quantization parameter, by a quantization matrix which is a scale factor of the quantization step, and (iii) adjusts the filter strength, by adjusting the multiplied quantization step to have a value corresponding to a quantization parameter corresponding to the filter strength calculated by the deblocking filter strength calculation unit, when the quantization parameter corresponding to the filter strength is beyond the range. Furthermore, the H.264 encoder 102 is one example of the coding unit which codes the quantization parameter which is selected by the filter strength adjustment unit, and a value of the quantization matrix which is used in the multiplying. FIG. 7 is a table showing a relationship between a filter strength and weightScale in the case where a substantial quantization parameter is 30. In FIG. 7, a combination of a provisional quantization parameter and weightScale in this case and a strength α for the combination are shown. If the deblocking filtering is to be performed with a filter strength smaller than an initial value of the standard shown in FIG. 6 while the substantial quantization parameter is kept as 30, weightScale to be used is weightScale corresponding to a provisional quantization parameter whose position is 24, 18, or 12. In this case, the value of the provisional quantization parameter corresponding to weightScale to be used, namely 24, 18, or 12, is coded. Thereby, the filter strength adjustment unit 108 can perform deblocking filtering with the strength α which corresponds to the quantization parameter value 24, 18, or 12, while the substantial parameter is kept as 30. In addition, by setting FilterOffsetA, the filter strength can be adjusted more finely. If the deblocking filtering is to be performed with a filter strength greater than an initial value of the standard shown in FIG. 6, the deblocking filtering can be realized using the same principle as explained above, so that the deblocking filtering is not explained here.

It should be noted that functional blocks in the block diagrams (FIGS. 1, 2, and 4) are typically implemented into a large-scale integration (LSI) which is an integrated circuit. These may be integrated separately, or a part or all of them may be integrated into a single chip. For example, functional blocks except a memory may be integrated into a single chip.

Here, the integrated circuit is referred to as a LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

It should be also noted that only a means for storing data to be coded or decoded, among these functional blocks, may be realized as another structure, without being integrated into the single chip.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention.

INDUSTRIAL APPLICABILITY

The present invention can be used to share moving picture data between different apparatuses. Especially, the present invention can be used as mobile telephones which serve as television telephones, HDD recorders and DVD recorders which perform long-length recording of high-resolution image such as high-definition broadcast, and the like.

What is claimed is:

1. A coding method conversion apparatus which converts first coded data into second coded data, the first coded data being coded according to a first coding method, said apparatus comprising:
  a processor;
  a decoding unit configured to decode, using the processor, the first coded data;
  a deblocking filtering position determination unit configured to determine, as a deblocking filtering position on which deblocking filtering is to be performed, one of (a) a first boundary of blocks, each of the blocks of the first boundary of blocks having an orthogonal transform size used in coding the first coded data, and (b) a second boundary of blocks, each of the blocks of the second boundary of blocks having an orthogonal transform size to be used in re-coding the first coded data decoded by said decoding unit as the second coded data, and
  a coding unit configured to (i) perform the deblocking filtering on the deblocking filtering position, and (ii) re-code the first coded data decoded by said decoding unit,
  wherein, when the second coded data is to be less compressed than the first coded data, (i) said deblocking filtering position determination unit determines the first boundary of blocks as the deblocking filtering position when the orthogonal transform size of the blocks of the first boundary of blocks is smaller than the orthogonal transform size of the blocks of the second boundary of blocks, and (ii) said deblocking filtering position determination unit determines the second boundary of blocks as the deblocking filtering position when the orthogonal transform size of the blocks of the second boundary of blocks is smaller than the orthogonal transform size of the blocks of the first boundary of blocks.

2. The coding method conversion apparatus according to claim 1, further comprising
  a deblocking filter strength calculation unit configured to calculate a filter strength of the deblocking filtering using at least one piece of decoding information from among pieces of decoding information obtained by decoding the first coded data, the at least one piece of decoding information not being a coding type of the first coded data, wherein said deblocking filter strength calculation unit is configured (i) to perform a weighted addition on evaluation values by (a) weighting each of the evaluation values and (b) adding the weighted evaluation values together, each of the evaluation values corresponding to a piece of decoding information from among the pieces of decoding information, and (ii) calculate a single filter strength, as the filter strength of the deblocking filtering, corresponding to a result of the weighted addition, wherein said coding unit performs the deblocking filtering on the deblocking filtering position according to the filter strength calculated by said deblocking filter strength calculation unit.

3. The coding method conversion apparatus according to claim 1, further comprising:

a deblocking filter strength calculation unit configured to calculate a filter strength of the deblocking filtering using at least one piece of decoding information from among pieces of decoding information obtained by decoding the first coded data, the at least one piece of decoding information not being a coding type of the first coded data, a decoding information analysis unit configured to calculate, as the at least one piece of decoding information from among the pieces of decoding information, at least one of (i) a coded amount, (ii) an average value of quantization parameters, (iii) the number of intra-predicted macroblocks, and (iv) a sum of absolute values of motion vectors or a simple sum of the motion vectors, using a syntax element and additional information obtained by decoding the first coded data, wherein said coding unit performs the deblocking filtering on the deblocking filtering position according to the filter strength calculated by said deblocking filter strength calculation unit.

4. The coding method conversion apparatus according to claim 2, further comprising a coding information analysis unit configured to calculate, as coding information, one of (i) an average value of quantization parameters, (ii) a target coded amount, and (iii) a target coding rate, using a syntax element and additional information obtained when the second coded data is generated, wherein said deblocking filter strength calculation unit is configured to calculate the filter strength using at least one of (a) the piece of the decoding information and (b) the coding information.

5. The coding method conversion apparatus according to claim 3, wherein said deblocking filter strength calculation unit is configured to calculate a higher filter strength as the average value of the quantization parameters increases, the average value being the at least one piece of decoding information from among the pieces of decoding information.

6. The coding method conversion apparatus according to claim 3, wherein said deblocking filter strength calculation unit is configured to calculate a higher filter strength as a value of a complexity increases, the value of the complexity being calculated by performing an arithmetic operation on (i) the average value of the quantization parameters and (ii) the coded amount, the average value of the guantization parameters and the coded amount being pieces of decoding information from among the plurality of pieces of decoding information.

7. The coding method conversion apparatus according to claim 3, wherein said deblocking filter strength calculation unit is configured to calculate a higher filter strength as a ratio of the number of the intra-predicted macroblocks to an image increases, the number of the intra-predicted macroblocks being the at least one piece of decoding information from among the pieces of decoding information.

8. The coding method conversion apparatus according to claim 3, wherein said deblocking filter strength calculation unit is configured to calculate a higher filter strength as the sum of absolute values of the motion vectors or the simple sum of the motion vectors increases, the sum or the simple sum being the at least one piece of decoding information from among the pieces of decoding information.

9. The coding method conversion apparatus according to claim 1, a deblocking filter strength calculation unit configured to calculate a filter strength of the deblocking filtering using at least one piece of decoding information from among pieces of decoding information obtained by decoding the first coded data, the at least one piece of decoding information not being a coding type of the first coded data, wherein said deblocking filter strength calculation unit is configured to calculate the filter strength using at least one of deblocking_filter_control_present_flag, disable_deblocking_filter_idc, slice_alpha_c0_offsetdiv2, and slice_beta_offset_div2 which are syntax elements of an H.264/AVC standard, when the first coding method is the H.264/AVC standard, and wherein said coding unit performs the deblocking filtering on the deblocking filtering position according to the filter strength calculated by said deblocking filter strength calculation unit.

10. The coding method conversion apparatus according to claim 1, wherein said deblocking filtering position determination unit is configured to determine the deblocking filtering position using deblocking_filter_control_present_flag and disable_deblocking_filter_idc which are syntax elements of an H.264/AVC standard, when the first coding method is the H.264/AVC standard.

11. The coding method conversion apparatus according to claim 1, further comprising:

a deblocking filter strength calculation unit configured to calculate a filter strength of the deblocking filtering using at least one piece of decoding information from among pieces of decoding information obtained by decoding the first coded data, the at least one piece of decoding information not being a coding type of the first coded data, a filter strength adjustment unit configured to (i) select a quantization parameter which does not change the filter strength and whose value is within a range defined by a standard of the second coding method, (ii) multiply a quantization step, which is determined by the selected quantization parameter, by a quantization matrix which is a scale factor of the quantization step, and (iii) adjust the filter strength by adjusting the multiplied quantization step to have a value corresponding to a quantization parameter corresponding to the filter strength calculated by said deblocking filter strength calculation unit when the quantization parameter corresponding to the filter strength is beyond the range defined by the standard of the second coding method; and a second coding unit configured to (i) code the quantization parameter selected by said filter strength adjustment unit, and (ii) value of the quantization matrix used in the multiplying, wherein said coding unit performs the deblocking filtering on the deblocking filtering position according to the filter strength calculated by said deblocking filter strength calculation unit and adjusted by said filter strength adjustment unit.

12. The coding method conversion apparatus according to claim 11, wherein said filter strength adjustment unit is configured to select the quantization parameter so that a difference is minimized when the quantization parameter corresponding to the filter strength is beyond the range defined by the standard of the second coding method, the difference being a difference between (i) a quantization parameter which corresponds to the quantization step to be multiplied by the quantization matrix and (ii) a quantization parameter which has been coded immediately prior to the quantization parameter which corresponds to the iuantization step to be multiplied by the iuantization matrix, and wherein said second coding unit is configured to code the difference.

13. A coding method conversion method of converting first coded data into second coded data, the first coded data being coded according to a first coding method, said method comprising:

decoding, using a processor, the first coded data;

determining a deblocking filtering position, on which deblocking filtering is to be performed, as one of (a) a first boundary of blocks, each of the blocks of the first boundary of blocks having an orthogonal transform size used in coding the first coded data, and (b) a second boundary of blocks, each of the blocks of the second boundary of blocks having an orthogonal transform size to be used in re-coding the first coded data decoded by said decoding as the second coded data ; and performing the deblocking filtering on the deblocking filtering position, and re-coding the first coded data decoded in said decoding, wherein, when the second coded data is to be less compressed than the first coded data, (i) the first boundary of blocks is determined as the deblocking filtering position when the orthogonal transform size of the blocks of the first boundary of blocks is smaller than the orthogonal transform size of the blocks of the second boundary of blocks, and (ii) the second boundary of blocks is determined as the deblocking filtering position when the orthogonal transform size of the blocks of the second boundary of blocks is smaller than the orthogonal transform size of the blocks of the first boundary of blocks.

14. A non-transitory computer readable recording medium having stored thereon, a program used in a coding method conversion apparatus which converts first coded data into second coded data, the first coded data being coded according to a first coding method, wherein, when executed, said program causes the coding method conversion apparatus to perform a method comprising:

decoding the first coded data;

determining a deblocking filtering position, on which deblocking filtering is to be performed, as one of (a) a first boundary of blocks, each of the blocks of the first boundary of blocks having an orthogonal transform size used in coding the first coded data, and (b) a second boundary of blocks, each of the blocks of the second boundary of blocks having an orthogonal transform size to be used in re-coding the first coded data decoded by said decoding as the second coded data and performing the deblocking filtering on the deblocking filtering position, and re-coding the first coded data decoded in said decoding, wherein, when the second coded data is to be less compressed than the first coded data, (i) the first boundary of blocks is determined as the deblocking filtering position when the orthogonal transform size of the blocks of the first boundary of blocks is smaller than the orthogonal transform size of the blocks of the second boundary of blocks, and (ii) the second boundary of blocks is determined as the deblocking filtering position when the orthogonal transform size of the blocks of the second boundary of blocks is smaller than the orthogonal transform size of the blocks of the first boundary of blocks.

* * * * *

UNITED STATES PATENT AND TRADEMARK OFFICE
CERTIFICATE OF CORRECTION

| | |
|---|---|
| PATENT NO. | : 8,045,821 B2 |
| APPLICATION NO. | : 12/031061 |
| DATED | : October 25, 2011 |
| INVENTOR(S) | : Kei Tasaka et al. |

It is certified that error appears in the above-identified patent and that said Letters Patent is hereby corrected as shown below:

Claim 4, Line 2 (Column 15, Line 40)
"claim 2, further comprising" should be -- claim 3, further comprising --

Claim 12, Line 13 (Column 17, Line 25)
"the iuantization step to be multiplied by the iuantization" should be -- the quantization step to be multiplied by the quantization --

Signed and Sealed this
Sixth Day of March, 2012

David J. Kappos
*Director of the United States Patent and Trademark Office*